Nov. 14, 1939.  J. BIJUR  2,179,489
LUBRICATION
Filed Dec. 11, 1935  3 Sheets-Sheet 1
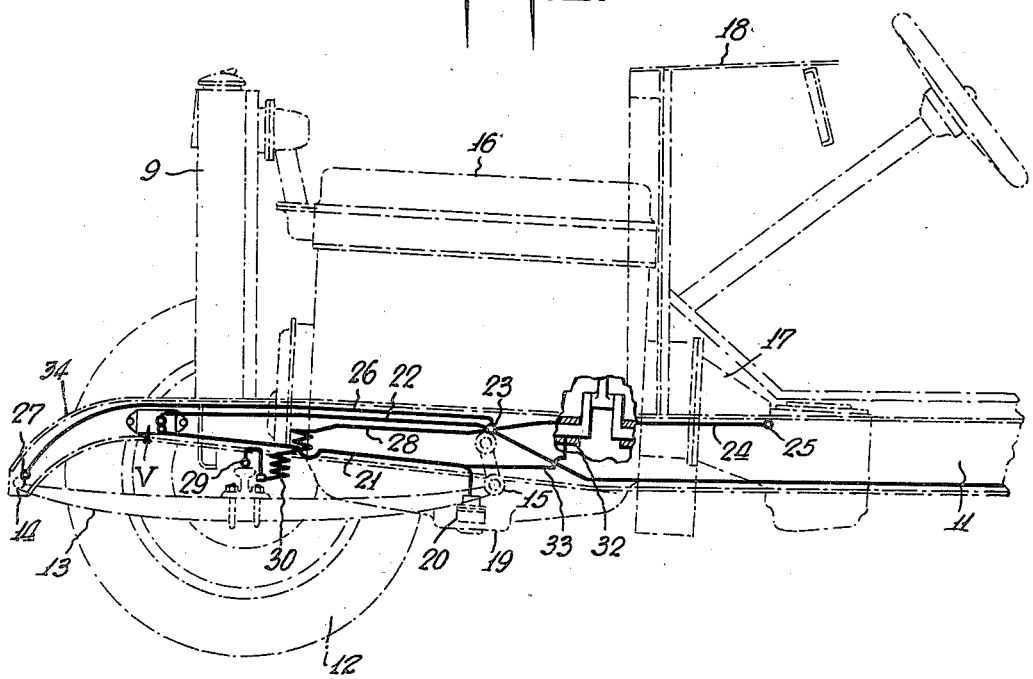
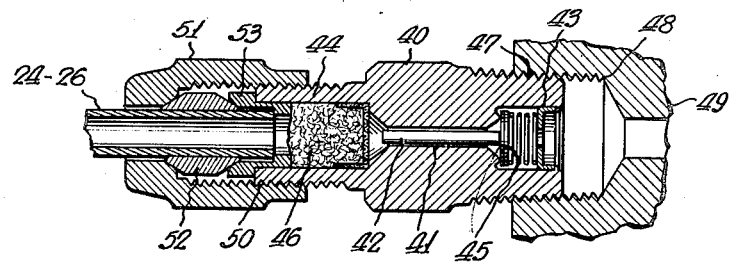
INVENTOR
Joseph Bijur, Deceased
by George Bijur, Executor
BY
Dean Fairbank Hirsch & Foster
ATTORNEYS

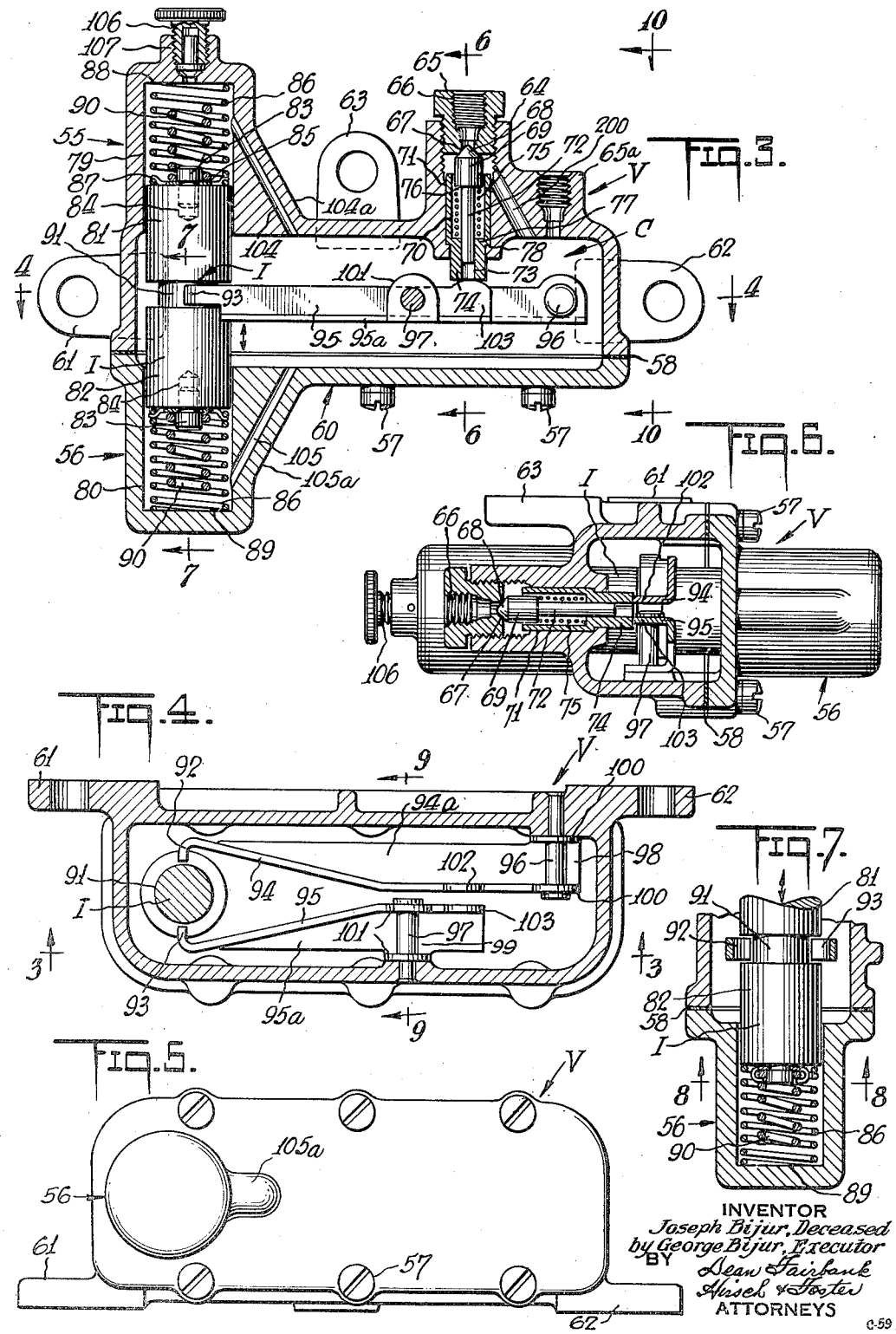

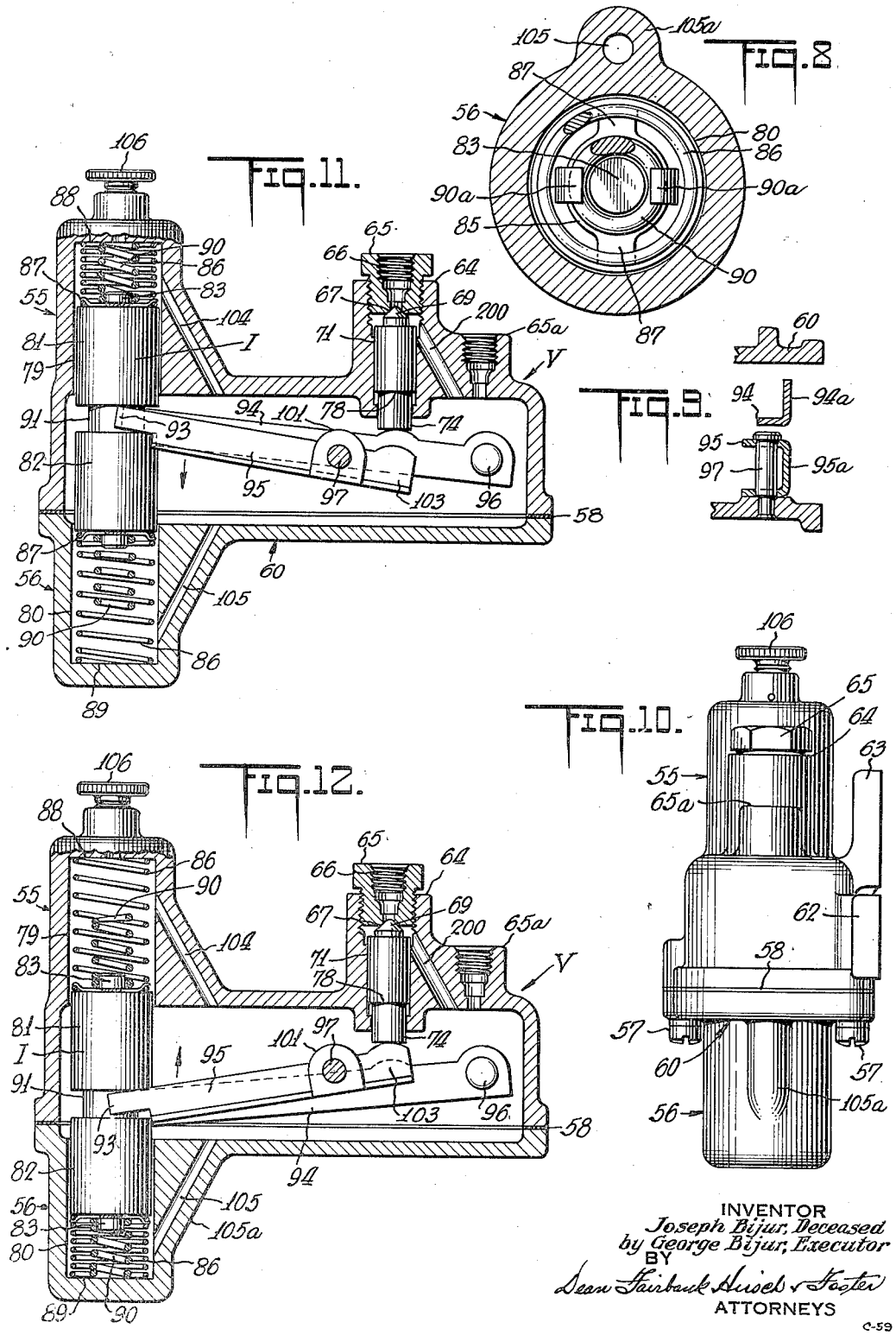

Patented Nov. 14, 1939

2,179,489

UNITED STATES PATENT OFFICE 2,179,489

LUBRICATION

Joseph Bijur, deceased, late of New York, N. Y., by George Bijur, executor, New York, N. Y., assignor to Auto Research Corporation, a corporation of Delaware Application December 11, 1935, Serial No. 53,882

11 Claims. (Cl. 184—7)

The present invention is concerned with central lubrication and it has a particular field of usefulness in the oiling of all or some of the bearings of a motor vehicle, but it is to be understood that the principles of the invention may also be applied to the lubrication of the bearings of other mechanisms and machinery.

In the prior application, Serial No. 525,971, filed March 28, 1931, there is disclosed an automatically controlled installation for periodically admitting engine oil pressure to a chassis distributing system, for example, of the drip plug type, in which a valve is actuated automatically by the operation of the motor vehicle to admit the engine oil pressure to the distributing piping line for controlled periods at desired intervals.

In the construction specifically shown in said prior application, an inertia weight device is positioned on the chassis frame and this inertia weight of the device is supported on the lever carrying a pawl, which pawl actuates a ratchet. The ratchet is caused to drive a cam which is provided with a lobe, which periodically lifts the valve against the force of a spring, which closes the valve after the lobe had passed.

The closure of the valve by the spring is preferably retarded by a dashpot arrangement, in which oil of about the same viscosity as the engine oil is employed. Preferably the entire unit including the dashpot is placed in the horn of the chassis where it would be exposed to atmospheric temperature and where the viscosity of the oil in the dashpot would be substantially the same as the viscosity of the oil in the distributing lines leading to the drip plug outlets.

This would assure that the bearing would be supplied with more uniform quantities of lubricant throughout the year, whether summer or winter, since with increased viscosity and decreased temperature the distributing lines would be connected to the engine oil pump for a much longer period, than in the summer time when the oil was very fluid and the temperature was relatively high, such more fluid oil passing through through the drip plug much more readily than the more viscous oil in winter time.

It is among the objects of the present invention to provide certain modifications in the means and method of said aforementioned application according to which the control valve mechanism is received in the casing entirely filled with the engine oil, so that such engine oil body will be available both to govern the effective length of opening of the valve and also so that the engine oil lubricant would be available to lubricate all parts of the control valve mechanism.

Other objects will be obvious or will appear during the course of the following specification.

According to one embodiment of the present invention, a casing is provided containing an inertia device and a valve, said valve and inertia device being entirely enclosed within the casing and said casing being provided with an inlet from the engine oil pump and an outlet to a distributing system, such as a drip plug distributing system of the type shown in Patents No. 1,632,771 and No. 1,975,920.

The casing is substantially entirely filled with engine oil, and in said casing is provided a vertical cylindrical chamber to receive the inertia weight. The chamber closely fits the inertia weight and the inertia weight is balanced or floated in a median position within this chamber by upper and lower opposing springs, so that upon operation of the automobile, or other vehicle, over a road or street, the inertia weight would be caused to oscillate. This fit may be several thousandths of an inch to permit quite free action with thin oil, and, of course, a relatively more dampened action with heavy oil.

Since the chamber receiving the inertia weight is filled with oil exposed to atmospheric temperature, the vibrations of the inertia weight in turn would be substantially more or less controlled by the viscosity of the oil, movements of increased amplitude being possible at higher temperatures with decreased lubricant viscosity, and of decreased amplitude being possible at lower winter temperatures with increased viscosity.

The outlet from the casing to the distributing piping line is preferably open at all times, while the inlet to the casing from the engine oil pump is preferably closed by a spring-pressed valve, the spring having a sufficiently high tension to maintain the valve closed against low engine oil pressure, say up to about fifteen to twenty pounds per square inch.

With higher engine oil pressures, however, the valve is opened and flow is established through the casing to the outlet to the distributing lines.

The weight is preferably connected to the spring of the valve in such a way as to increase the tension on said spring in proportion to the movement of the weight away from its median floating position, and with increased movements of the weight the valve is substantially closed the entire time against normal operating engine oil pressures between 20 to 40 pounds per square inch except for short periods as the weight is passing through its median position.

As a result in summer the valve would close the inlet to the casing during most of the time and assure that engine oil pressure would only be connected to the drip plug line during the short periods necessary to force the requisite amounts of lubricant to the bearings past the highly restricted drip plugs.

In winter time, on the other hand, when the weight is damped sufficiently to be kept substantially balanced in its median position, the valve will be maintained open during substantially the entire operating period of the automobile and the engine oil pump pressure will be applied to the lines substantially for the entire running period to force the much more viscous lubricant through the drip plugs to the bearings. As a result, more uniform lubrication would be assured from summer to winter conditions even with substantial changes in the temperature.

In the accompanying drawings, in which is shown one of various possible embodiments of the several features of the invention, Fig. 1 is a side view of the front part of an automobile with the hood and adjacent wheel removed, illustrating the application of the lubricating installation of the present application thereto.

Fig. 2 is a longitudinal sectional view upon an enlarged scale of one type of a flow metering instrumentality which may be utilized.

Fig. 3 is a side sectional view of the inertia controlled valve mechanism.

Fig. 4 is a transverse sectional view upon the line 4—4 of Fig. 3.

Fig. 5 is a bottom view of the unit.

Fig. 6 is a transverse sectional view upon the line 6—6 of Fig. 3.

Fig. 7 is a transverse sectional view upon the line 7—7 of Fig. 3.

Fig. 8 is a transverse sectional view of the weight and enclosing chamber upon the line 8—8 of Fig. 7, upon an enlarged scale.

Fig. 9 is a transverse sectional view upon the line 9—9 of Fig. 4.

Fig. 10 is an end view of the mechanism upon line 10—10 of Fig. 3, and

Figs. 11 and 12 are side views in partial section, similar to Fig. 3, illustrating the operation of the valve when the inertia weight is in its upper and lower extreme positions respectively.

In Fig. 1, the automobile chassis 11 is supported on the wheels 12 by the springs 13, the ends of which are respectively hinged and shackled, as indicated at 14 and 15, to said chassis. Upon the chassis 11 is supported the radiator 9 and the engine 16 with its cooperating clutch housing 17 and the body partially shown at 18.

The lower part of the engine 16 is provided with an oil pan 19 containing the engine lubricating pump 20, which in addition to supplying the engine bearings, one of which is diagrammatically illustrated at 32 with its conduit 33, also connects with the chassis system by a conduit 21 leading to the valve structure V secured in the U-shaped side member 34 of the chassis frame, preferably in front of the radiator 9.

From the valve V the line 22 leads to the combined junction and flow metering device or drip plug 23 supplying the spring shackle 15. This junction connects with the line 24 supplying the clutch housing 17 by means of the flow metering device or drip plug 25, the line 26 with the flow metering device or drip plug 27 supplying the front hinge and the conduit 28 leading to the front axle line 29 by the helical bridge coil 30.

A typical form of flow metering device or drip plug is shown in Fig. 2.

In this embodiment the body 40 has a central bore 41 substantially filled by pin 42 forming an annular restriction passage therewith, the length and diametral clearance of said passage determining the rating of the drip plug.

The body is also provided with outlet and inlet sockets 43 and 44 respectively, the former containing the spring seated check valve 45 and the latter containing the protective strainer plug 46.

The outlet end of the drip plug is provided with a pipe thread 47 for insertion in the tapped socket 48 in the bearing structure 49 and the inlet end of the drip plug is provided with a straight thread 50 for attachment of the thimble 51, the compression sleeve 52 being clamped between said thimble 51 and the sleeve 53 inserted in the inlet socket 44 to grip the tubing end 24—26.

The drip plug, as shown, is adapted to be utilized at the end of the line, as shown at 25 and 27 (see Fig. 1), but with the provision of a junction head (as shown in application Serial No. 525,971, filed March 28, 1931), instead of the pipe coupling thimble 51, it may be employed in the run of a line as at 23.

The valve structure V, as shown in Figs. 3 to 12, is enclosed in a casing 60 which may be readily attached to a backing plate or to the web of the U-frame of the chassis by bolts (not shown) passing through the holed ears 61, 62 and 63.

The casing 60 is preferably made of an upper section 55 and a lower section 56 which are bolted together by the screws 57, the intermediate gasket 58 closing the jointure in a liquid-tight fashion.

The casing 60 is provided with a tapped inlet nipple 64 and a tapped outlet nipple 65a communicating with the interior chamber C of said valve casing.

Into the inlet nipple 64 is screwed the nut member 65 having the tapped socket 66 for reception of a compression coupling connection from the tubing section 21 communicating with the outlet of the engine oil pump 20.

The inner end of the plug 65 is provided with a valve seat 67 which cooperates with the conical nose 68 of the valve member 69. The valve member 69 is adapted to slide within the sleeve 70, which in turn slides within the bore 71 in the body 60. The valve 69 is provided with a stem 72 which slides in a small bore 73 in the reduced lower portion 74 of the sleeve 70. The lubricant may flow from the inlet 66 to the chamber C by the passage 200.

The upper portion of the sleeve 70 receives the coil spring 75 which reacts between the shoulder 76 on the valve and the shoulder 77 on the interior of the sleeve at the beginning of the reduced portion 74. The exterior of the sleeve is also provided with a shouldered stop 78 to limit its downward movement under the force of said spring 75.

As shown in Fig. 3, the stressed spring 75 has pressed the valve 69 and the sleeve 70 away from each other to the maximum extent with the spring 75 closing the valve against the seat 67 to overcome lower engine oil pressures so that the valve will not be open when the engine is idling or when the car is standing still.

The stressing of the spring in the position shown in Fig. 3 may be varied between fifteen to twenty-five pounds depending upon the operating characteristics of the engine oil pump of the automobile upon which the unit is placed.

On the other side of the casing 60 there is provided upper and lower cylindrical recesses 79 and 80, which receive the upper and lower cylindrical portions 81, and 82 respectively, of the weight I.

The bore of said chamber 79 and 80 closely fits the external diameter of the cylindrical elements 81 and 82 of the weight I so that there will be substantial damping of said weight in moving through said chambers 79 and 80.

At the upper and lower ends of the weight I are provided the studs 83, the shanks of which studs fit into the bores 84 (see Fig. 3). The studs 83 hold the plates 85, which hold the inner rungs of the coil springs 86 by the ears 87. The other rungs of the coil springs 86 react against the top 88 and the bottom 89 of the chambers 79 and 80 respectively (see Fig. 3).

Around the studs 83 are also fitted the buffer springs 90 held in position by the ears 90a struck up from said plate 85 (see Fig. 8). These springs 90 stop extreme movements of the weight I, such extreme movements being best shown in Figs. 11 and 12.

The two sections 81 and 82 of the weight I are connected by a neck of reduced diameter 91, which neck receives the inturned fingers 92 and 93 of the lever arms 94 and 95.

The lever arms 94 and 95 are provided with the base flanges 94a and 95a and respectively pivotally mounted by the pins 96 and 97 by the U-shaped sections 98 and 99 of the arms 94 and 95 having the spaced side flanges 100 and 101.

The levers 94 and 95 are provided with the embossed or elevated contacting elements 102 and 103, which contact with and actuate the reduced diameter portion 74 of the sleeve 70.

As is best indicated in Figs. 11 and 12, with increased amplitude of motion of the inertia weight element I away from its median floating position, shown in Fig. 3, stressing of the valve seating spring 75 will be increased. The valve 68 is closed only when the weights are at one or the other outer position of their strokes and not in their median position. If from the median position shown in Fig. 3 the weight I goes down, arm 95 will elevate 103, closing the valve; arm 94 simultaneously will go down. If, on the other hand, from the middle position of Fig. 3 the weight I goes up, arm 94 will elevate 102, closing the valve, while arm 95 will lower 103. As a result the effective opening of the valve 68 will be less in summer as compared to winter and engine oil pressure will be applied for longer periods of time and with greater intensity in winter than in summer.

This will assure more uniform lubrication in spite of the varying of the lubricant viscosity in the chassis distributing lines as between winter and summer temperatures.

With decreased lubricant viscosities the lubricant will more readily flow through the bores 104 and 105 in the bosses 104a and 105a which establish communication between the interior chamber C and the outer portions of the chambers 79 and 80, and will also more readily flow through the clearance between said chambers 79 and 80 and the weight portions 81 and 82. With decreased viscosity or increased temperature during operation of the vehicle, the weight most of the time will be in the outer positions of its swing and only when it is in its median position may the valve 68 open to permit flow from the engine oil pump to the lines.

Upon the other hand, in winter time when the oil is of increased viscosity the movement of the weight I will be greatly retarded so that the weight will normally balance without substantial movement at its floating position with the result that the valve 68 may be opened a greater part of the time to permit increased application of engine oil pressure to the lines to force the more viscous lubricant through the distributing lines and past the restricted drip plugs to the bearings.

To remove the air from the upper part of the chamber 79 the removable plug 106 may be provided fitting into the threaded socket 107.

The inertia control valve mechanism of the present invention therefore enables a regulation as between winter and summer substantially to compensate for variations in lubricant viscosity, with resultant assurance that the feed of lubricant will be maintained in predetermined ranges both in summer and winter time.

The inertia control valve mechanism of the present invention may also be utilized for other purposes.

The valve mechanism, as shown in Fig. 1, might be placed in other positions on the motor vehicle and in other suitable arrangements.

By the expression "non-circulatory lubricating system", is meant a system in which the lubricant is not collected and returned to the reservoir after usage at the bearing as is characteristic of chassis lubricating systems, in contrast to the engine lubricating systems of automotive vehicles which are of the circulatory type.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

What is claimed is:

1. A central lubricating installation for a plurality of bearings of a mechanism comprising a branched distribution conduit system leading to said bearings, a source of lubricant pressure, means for periodically admitting said lubricant pressure to said system during operation of the mechanism and temperature-controlled means for regulating the duration of the periods of admission, said last mentioned means including an oscillating member, a spring seated value controlled by said member, actuating connections between said valve and said member, whereby said valve will open in inverse ratio to the amplitude of oscillation of said member, and means to retard the amplitude of oscillation of said member in inverse proportion to the temperature, so that the oscillation will have a greater amplitude at increased temperature and a lesser amplitude at decreased temperature.

2. A lubricating system comprising a reservoir, a conduit system for distributing lubricant to a plurality of bearings, a continuously operating pump mechanism for intermittently supplying lubricant from said reservoir to said conduit system, and means operable periodically to render said pumping mechanism effective to supply lubricant under pressure to said conduit system, the duration of the effective periods of operation being dependent upon the viscosity of the lubricant, said last mentioned means including an oscillating floating member, a spring seated valve controlled by said member, actuating connections between said valve and said member, whereby said valve will open in inverse ratio to the amplitude of oscillation of said member, and means to retard the oscillations of said member in inverse proportion to the temperature, so that the oscillation will have a greater amplitude at increased temperature and a lesser amplitude at decreased temperature.

3. In a motor vehicle of the type having an engine with a plurality of spaced bearings, a chassis with a plurality of spaced bearings, said chassis being driven and moved over a road by said engine, said engine bearings requiring relatively large amounts of lubricant during movement of the engine and said chassis bearings requiring relatively small amounts of lubricant during road movement of the chassis, said chassis being provided with wheels carrying structures, a chassis frame and spring supporting said frame on said structure, whereby said frame will be caused to undergo a periodic vertical vibration or oscillation during road movement of the chassis, a lubricating installation for said bearings including a central reservoir casing enclosing the spaced bearings of said engine to receive any overflow from said engine bearings, a gear pump directly driven from said engine supplied with lubricant from said reservoir, a distributing conduit system leading from said gear pump to said bearings, said conduit system having unrestricted communication with the engine bearings and being provided with drip plug outlets to the chassis bearings; the combination therewith of flow regulating means upon the conduit system in the course of flow leading to the chassis bearings, said flow regulating means being actuated by said periodic vertical vibration and oscillation of said chassis frame to cut off lubricant flow from said gear pump to said chassis bearings and to permit only an intermittent flow at intervals from said gear pump to said system toward said chassis bearings, said last mentioned means including a spring supported floating weight and a spring closed valve, the spring of which is insufficient to hold the valve closed as against normal operating engine oil pressures, said inertia weight actuating the spring of said valve to increase its closing pressure when said weight oscillates from its floating median position.

4. In a centralized lubricating system having a plurality of bearings to be lubricated, a flow resistance unit mounted at each bearing, a lubricant reservoir, a conduit extending from said reservoir to said flow resistance units, and a pump mechanism constructed and arranged periodically to pump lubricant to said bearings under high pressure, said mechanism including means responsive to the viscosity of the lubricant in said conduit to control the duration of discharge of said pump mechanism to the bearings, said last mentioned means including a spring closed valve on said conduit, said pump mechanism creating sufficient pressure to overcome the spring of said valve, and means to increase the seating pressure of the valve at frequent intervals so as to cause the valve to close against the pressure exerted by said pump for controlling the duration of the discharge of said pump mechanism into said conduit.

5. A lubricating installation comprising a source of lubricant pressure, a distributing conduit system and a connection between said source and said conduit system including an inertia controlled valve mechanism comprising a casing, a spring-seated valve, a floating weight therein and connector means between said weight and the spring of said valve to cause an increase in the seating pressure of said spring in proportion to the amplitude of vibration of the weight.

6. In a lubricating installation of the type having a source of pressure and a distributing system; the combination therewith of a spring-seated valve, a spring-floated weight and connections between the weight and the spring of said valve so as to increase the stressing of the spring of said valve with increased movement of the weight away from its normal at-rest floating position.

7. In a centralized lubricating installation having a central source of pressure and a distributing system and a connecting valve mechanism, said connecting valve mechanism comprising a casing having an inlet from the pressure source and an outlet to the system and being filled with lubricant from said source of pressure, a cylinder in said casing, a weight positioned in and closely fitting within said cylinder, floating springs below and above said weight adapted to cause said weight to float in a median position, buffer springs connected to the ends of said weight to stop excessive movements of the weight, a valve closing said inlet provided with an elongated stem, a coil spring encircling said stem pressing said valve to close said inlet, a sleeve fitting on said stem, serving as a reaction member for the spring and controlling the seating pressure thereof and two levers actuated by said weight and having contacting faces to press said sleeve against said coil spring to increase the seating pressure thereof, one lever being provided with a fulcrum on the side of said valve away from the weight and the other lever being provided with a fulcrum on the side of said valve toward said weight, whereby one of said levers will press said sleeve against said coil spring when said weight moves substantially away from its median position in either direction, the amount of said pressure increasing with the magnitude of the stroke of the weight.

8. In a centralized lubricating installation, having a pump and a distributing system, a control valve device, comprising a casing normally filled with lubricant, having an inlet connection from the pump and an outlet connection to a distributing system, a valve closing said inlet connection, a spring closing said valve, an oscillating member in said casing, means to damp the member by the lubricant therein and a connection from said oscillating member to the spring of said valve, whereby the seating pressure of the spring will increase with the movement of said member from its middle position, said pump creating sufficient pressure to open said valve against said spring when the pressure of the spring has not been increased.

9. In a lubricating installation, a control valve, resilient means to press said control valve, to its seat and a temperature controlled device to increase the seating pressure of said valve at increased temperature and decrease it at decreased temperature, said device including a cylinder, a weight reciprocating in said cylinder, springs to balance said weight in said cylinder, said cylinder being constructed to damp the movement of said weight, and an actuating connection between said weight and said resilient means.

10. A centralized lubricating installation comprising a central lubricant pressure source, a distributing piping system, and an oscillating control valve to permit lubricant pressure to be exerted at intervals upon said system, and means to close said control valve with greater pressure for longer periods with decreased lubricant viscosity and with increased temperature, and with decreased pressure for shorter intervals with increased lubricant viscosity and with decreased temperature, said means to close said control valve, including a balanced reciprocating member, a cylinder to receive said reciprocating member, said cylinder being constructed to damp said reciprocating member and in inverse ratio to the viscosity of the lubricant, and connections between said reciprocating member and said valve to cause said valve to control the closing pressure upon said valve.

11. The installation of claim 1, said source including a continually operating pump supplying lubricant to another system.

GEORGE BIJUR,
*Executor of the Estate of Joseph Bijur, Deceased.*